United States Patent [19]

Fujimoto

[11] Patent Number: 5,470,287
[45] Date of Patent: Nov. 28, 1995

[54] COMMON TYPE ENGINE CONTROLLER FOR CONTROLLING AUTOMOTIVE ENGINE IN ACCORDANCE WITH THE TYPE OF TRANSMISSION

[75] Inventor: Takanori Fujimoto, Himeji, Japan

[73] Assignee: Mitsubishi Denki Kabushiki Kaisha, Tokyo, Japan

[21] Appl. No.: 307,180

[22] Filed: Sep. 16, 1994

[30] Foreign Application Priority Data

Sep. 29, 1993 [JP] Japan ................... 5-243277

[51] Int. Cl.$^6$ .................... B60K 41/06; B60K 17/04; F02D 41/06
[52] U.S. Cl. .................. 477/99; 477/107; 364/431.04; 364/431.1
[58] Field of Search ................. 477/97, 99, 107, 477/111; 364/431.04, 431.07, 431.1

[56]        References Cited
        U.S. PATENT DOCUMENTS

| 4,829,439 | 5/1989 | Otobe ................. 364/431.04 |
| 5,086,667 | 2/1992 | Katayama et al. .......... 477/107 X |
| 5,107,431 | 4/1992 | Ohta et al. .............. 364/431.1 |
| 5,191,865 | 3/1993 | Minamitani et al. .......... 477/107 |

FOREIGN PATENT DOCUMENTS 134351   8/1984   Japan .

Primary Examiner—Rodney H. Bonck
Assistant Examiner—Nathan O. Jensen
Attorney, Agent, or Firm—Sughrue, Mion, Zinn, Macpeak & Seas

[57]                ABSTRACT

A common type engine controller controlling an automotive engine in accordance with the kind of the associated transmission (i.e., automatic or manual) includes an electronic control unit 54 consisting of a microcomputer. When used with an automatic transmission, the power supply circuit includes a neutral switch 53 inserted between the starter switch 51 of the vehicle and the magnet coil 52 controlling the current supply to the starter motor, wherein the starter signal $S_T$ is supplied to the electronic control unit 54 from the junction between the neutral switch 53 and the magnet coil 52, the neutral signal $N_T$ being supplied from the junction between the starter switch 51 and the magnet coil 52 (FIG. 2). When used with a manual transmission, on the other hand, the starter signal $S_T$ is supplied from the junction between the starter switch 51 and the magnet coil 52, and the neutral signal $N_T$ is grounded. Upon detecting the high level of the starter signal $S_T$, the electronic control unit 54 determines the kind of the associated transmission based on the level of the neutral signal $N_T$.

9 Claims, 3 Drawing Sheets

COMMON TYPE ENGINE CONTROLLER FOR CONTROLLING AUTOMOTIVE ENGINE IN ACCORDANCE WITH THE TYPE OF TRANSMISSION

BACKGROUND OF THE INVENTION

This invention relates to automotive engine controllers for controlling the fuel injection, the ignition timings, the idling speed, etc., of an automotive engine, and more particularly to the common type engine controllers which can be used both with vehicles with an automatic transmission and those with a manual transmission and which are capable of identifying the type of the transmission to adapt the control parameters of the engine in accordance the type of the transmission.

Generally, the various controlled parameters of an automotive engine, such as the timings of the fuel injection, the ignition timings and the idling RPM of the engine, are controlled by means of an electronic control unit in accordance with the operating condition of the engine. The electronic control unit of the engine controller consists of a microcomputer, and in the case of a common type engine controller, the same electronic control unit is used both in the vehicle with the automatic and that with the manual transmission. The engine controller receives various sensor signals indicating the operating condition of the engine and adapts the control parameters thereto. In particular, a detector means for detecting the neutral position of the transmission may be provided such that the control parameters may be adjusted in accordance with the position of the transmission.

Thus, when used with an automatic transmission, the engine controller adjusts the controlled parameters such as the target idling RPM of the engine in accordance with the position the transmission, (i.e., the engine controller changes the controlled parameters according as whether the transmission is in the neutral or the parking range, on the one hand, or in the driving range, on the other).

When used with a vehicle provided with a manual transmission, on the other hand, the inputs of the engine controller are wired in such a manner that the neutral signal which indicates the neutral state of transmission is constantly input to the engine controller. Thus the engine controller controls the idling speed of the engine, etc., with the manual transmission just as when the engine controller is used with an automatic transmission and the automatic transmission is in the neutral range.

The idling RPM of the engine, however, may be set lower for the manual transmission than for the automatic transmission. Thus, to reduce the fuel consumption, the recent trends have been to set the idling RPM for the manual transmission at about 600 RPM, which is substantially lower than that for the automatic transmission, which is, for example, about 650 RPM. The idling RPM for the automatic transmission cannot be set lower than 650 RPM, for example, since the oil pressure must be kept above a predetermined level such that the delay in the oil pressure response immediately after the transmission shift from the neutral to the driving range is minimized. Thus, to meet the more severe demands of recent years for the reduction of the fuel consumption, the electronic control unit must be designed separately for the automatic and the manual transmission. Thus, the kinds of the engine controllers, and hence the production cost thereof increase.

Japanese Patent Publication (Kokoku) No. 4-42535 thus proposes a common type engine controller which can be used both with the automatic and the manual transmission and distinguishes the type of the transmission by means of software. According to this Japanese Patent Publication, a neutral switch is provided for detecting the state of the transmission of the vehicle. When used with an automatic transmission, the neutral switch is turned on only when the transmission is at the neutral position. When used with a manual transmission, on the other hand, the circuit is wired in such a manner that the neutral switch is permanently turned on. If it is detected that the neutral switch is turned on during acceleration, it is judged that the transmission is manual. If the neutral switch is turned off during acceleration, it is judged that the transmission is automatic. The type of the transmission can thus be determined automatically.

In the case of the engine controller of the above Japanese Patent Publication, however, the determination of the type of the transmission is possible only after the vehicle is in acceleration. Only then the proper adjustment of the control parameters to the type of the transmission becomes possible, and hence it is not possible to adjust the idling speed of the engine, for example, to the type of the transmission.

SUMMARY OF THE INVENTION

It is therefore an object of this invention to provide an engine controller which is capable of determining the kind of the transmission immediately after the start of the engine, and the target values of the control variables including the idling speed can be adjusted accordingly.

The above object is accomplished in accordance with the principle of this invention by a common type engine controller for controlling an engine of an automotive vehicle in accordance with a kind, automatic or manual, of a transmission associated with the engine. The engine controller comprises: first signal generator means for generating a first signal which is at a first level when the engine is started, and is at a second level otherwise; second signal generator means for generating a second signal which, in the case where the transmission associated with the engine is automatic, is at a first level when the engine is started, and which is continually at a second level in the case where the transmission associated with the engine is manual; and first judgment means, coupled to the first and second signal generator means, for determining the kind of the transmission in response to the first and second signal, wherein, upon receiving the first level of the first signal, the first judgment means determines that the transmission is automatic if the second signal is at the first level and that the transmission is manual if the second signal is at the second level.

Preferably, the engine controller comprises, in the case where the transmission is automatic, a starter switch, a neutral switch and a magnet coil coupled serially across a battery supplying a power to a starter motor for the engine, wherein the starter switch is closed by a driver of the vehicle when the engine is started and the neutral switch is closed when the transmission is at a neutral or parking position, the magnet coil controlling a current supply from the battery to a starter motor of the engine upon start of the engine; and the engine controller comprises, in the case where the transmission is manual, the starter switch and the magnet coil coupled serially across the battery; wherein the first signal generated by the first signal generator means is supplied by a voltage at a terminal of the magnet coil at a side coupled to the battery; and the second signal generated by the second signal generator means is supplied by a voltage at a junction point between the starter switch and the neutral switch in the case where the transmission is automatic, and a ground voltage in the case where the transmission is manual.

Further, it is preferred that the second signal generator means further comprises: circuit means for retaining the second signal at the first level when, in the case where the transmission is automatic, the neutral switch is open and the junction point between the starter switch and the neutral switch is not grounded through the magnet coil; wherein the engine controller further comprises second judgment means for determining, in the case where the transmission is automatic, a position of the transmission, wherein the second judgment means determines that the transmission is at a neutral position when: (1) the first judgment means determines that the transmission is automatic, (2) the first signal is at the second level, and (3) the second signal is at the second level; or when (1) the first judgment means determines that the transmission is automatic, (2) the first signal is at the second level, (3) a predetermined length of time has elapsed after the first signal goes to the second level, (4) and the second signal is at the second level.

Preferably, the engine controller comprises idling speed control means for controlling an idling RPM of the engine in accordance with a detected kind of the transmission. Further, it is preferred that, when the detected kind of the transmission is automatic, the idling speed control means controls the idling RPM further in accordance with a position of the transmission detected by the second judgment means. Preferably, the idling speed control means controls the idling RPM of the engine by means of a feedback control method. Further, it is preferred that the engine controller comprises an electronic control unit consisting of a microcomputer and the first and the second judgment means comprise a program executed by the microcomputer.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
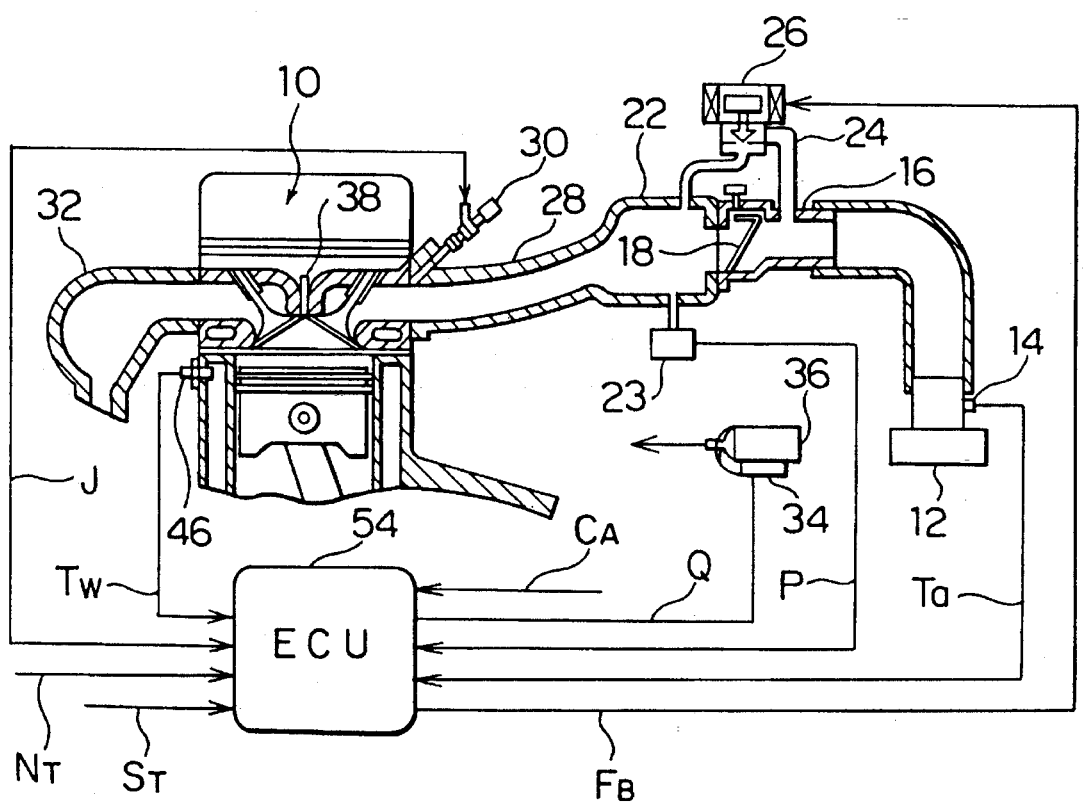
FIG. 1 is a block diagram showing the overall structure of the first embodiment according to this invention.

FIG. 1 is a block diagram showing the overall structure of the first embodiment according to this invention. The air is taken into the internal combustion engine 10 of an automotive vehicle through an air cleaner 12. The temperature Ta of the air taken in through the air cleaner 12 is detected by an air temperature sensor 14. Within a throttle body 16 is disposed a throttle valve 18 for controlling the amount of air intake. A surge tank 22 disposed at the downstream side of the throttle valve 18 prevents the interference of the air introduced into the cylinders of the engine.

An intake air pressure sensor 23 disposed at the surge tank 22 detects the pressure P within the surge tank 22. At the bypass 24 bypassing the throttle valve 18 is disposed an idling speed control (ISC) valve 26, which controls the amount of air intake during the idling periods of the engine by controlling the cross sectional area of the opening across the bypass 24. The air intake manifold 28 disposed at the downstream side of the surge tank 22 leads the air into the cylinders of the engine. The fuel injectors 30 mounted on the air intake manifold 28 injects the fuel toward time suction ports of the cylinders. The exhaust gas is led away from the cylinders through an exhaust manifold 32.

The igniter 34 generates the primary voltage in synchronism with the ignition timings of the engine. The ignition coil 36 supplied with the primary voltage from the igniter 34 generates the high ignition voltage at the secondary side thereof. The secondary voltage from the ignition coil 36 is supplied to the ignition plug 38 of the respective cylinders of the engine through a distributor (not shown). The water temperature sensor 46 detects the water temperature $T_W$ of the coolant water within the jacket surrounding the cylinders of the engine. The electronic control unit 54 consists of a microcomputer and generates various control signals based on the various sensor signals.

In addition to the temperature Ta, pressure P, and water temperature $T_W$ from the respective sensors, the electronic control unit 54 receives the crank angle $C_A$ generated in response to the RPM of the internal combustion engine 10, the neutral signal $N_T$ detecting the gear position of the transmission (not shown), and the starter signal $S_T$ for detecting the starting time of the engine, and controls the various engine parameters relating to the fuel injection, idling RPM and the ignition timings. Next the methods of control are described.

The fuel injection is controled as follows. First, on the basis of the crank angle $C_A$, the air pressure P detected by the intake air pressure sensor 23, etc., the electronic control unit 54 determines the fundamental amount of the fuel injection for each stroke of the internal combustion engine 10 (for half rotation of the crankshaft in the case of a four-cylinder engine). The electronic control unit 54 then corrects the fundamental amount of the fuel injection in accordance with the water temperature $T_W$ detected by the water temperature sensor 46, etc., and thereby obtains the actual amount of fuel injection. The control signal (open valve interval signal) J corresponding to the amount of fuel thus determined is output to the fuel injectors 30.

The idling speed control is performed as follows. On the basis of the deviation of the RPM of the engine during the idling period from the target idling RPM corresponding to the gear position of the transmission as determined from the neutral signal $N_T$, the electronic control unit 54 determines the feedback control amount and outputs the control signalers corresponding to the feedback control amount to the idling speed control (ISC) valve 26.

Further, the ignition timing control is performed as follows. On the basis of the RPM of the engine, the air pressure P detected by the intake air pressure sensor 23, etc., the electronic control unit 54 determines the ignition timing corresponding to the operating condition of the engine 10. The control signal Q corresponding to the ignition timing is output to the igniter 34.

Figure 2:
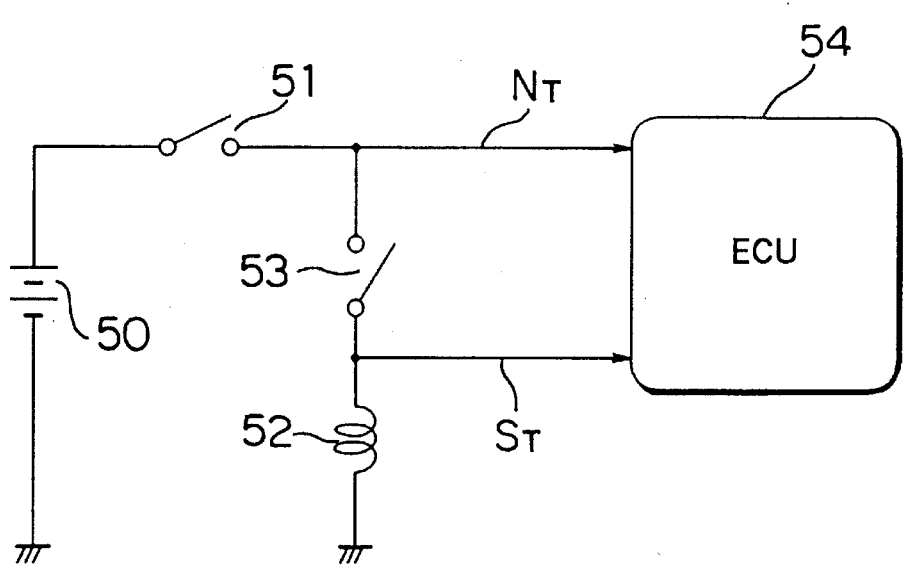
FIG. 2 is a diagram showing the electric connection of the electronic control unit 54 with the power supply circuit in the case where the electronic control unit 54 is used in a vehicle with an automatic transmission.
Figure 3:
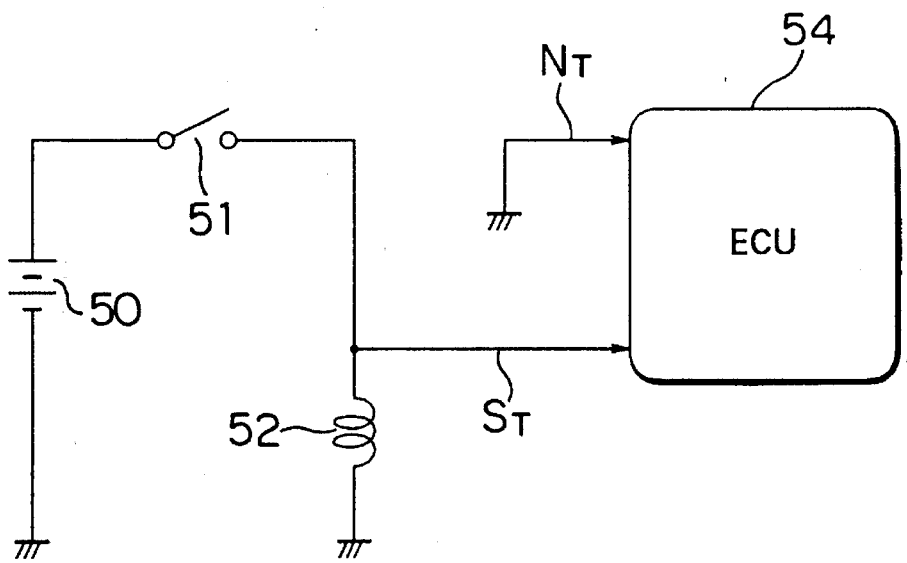
FIG. 3 is a diagram similar to that of FIG. 2, but showing the connection in the case where the electronic control unit 54 is used in a vehicle with a manual transmission.

FIG. 2 is a diagram showing the electric connection of the electronic control unit 54 with the power supply circuit in the case where the electronic control unit 54 is used in a vehicle with an automatic transmission. FIG. 3 is a diagram similar to that of FIG. 2, but showing the connection in the case where the electronic control unit 54 is used in a vehicle with a manual transmission. In FIGS. 2 and 3, the battery 50 is mounted on the vehicle. The starter switch 51 coupled to the positive terminal of the battery 50 is turned on (i.e., closed) when the engine is started. The magnet coil 52, inserted between the starter switch 51 and the ground, opens and closes the magnet switch (not shown) which controls the current supply from the battery 50 to the starter motor of the engine when the engine is started.

A neutral switch 53 is inserted between the starter switch 51 and the magnet coil 52 only when the electronic control unit 54 is used with the automatic transmission (FIG. 2). The neutral switch 53 is turned on (i.e., closed) when the transmission is outside of the driving range (i.e., either at the neutral or the parking position).

In the case where the electronic control unit 54 is used with an automatic transmission (FIG. 2), the current is supplied from the battery 50 to the magnet coil 52 through the serial connection of the starter switch 51 and the neutral switch 53. On the other hand, when the electronic control unit 54 is used with a manual transmission (FIG. 3), the current is supplied from the battery 50 to the magnet coil 52 through the starter switch 51 only.

The starter motor (not shown) for the engine is coupled to the power supply circuit. When the magnet switch is turned on upon excitation of the magnet coil 52, the current is supplied from the battery 50 to the starter motor. Thus, in the case of the automatic transmission (FIG. 2), the starter motor is supplied only when the starter switch 51 is turned on while the transmission is in the neutral range where the neutral switch 53 is closed. In the case of the manual transmission (FIG. 3), the starter motor may be supplied with current by turning on the starter switch 51 even when the vehicle is being driven.

The voltage at the side of the magnet coil 52 which is coupled to the battery 50 as input to the electronic control unit 54 as the starter signal $S_T$. In the case of an automatic transmission (FIG. 2), the voltage between the starter switch 51 and the neutral switch 53 is input to the electronic control unit 54 as the neutral signal $N_T$. However, the terminal of the electronic control unit 54 for receiving the neutral signal $N_T$ is grounded in the case of a manual transmission (FIG. 3).

If the electronic control unit 54 is used with an automatic transmission, both the starter switch 51 and the neutral switch 53 are closed when the engine is started. Thus, the neutral signal $N_T$ and the starter signal $S_T$ both becomes at the high level when the engine is started. On the other hand, if the electronic control unit 54 is used with the manual transmission, the neutral signal $N_T$ remains permanently at the ground level. Thus when the engine is started, the starter signal $S_T$ rises to the high level, but the neutral signal $N_T$ remains at the ground level. Thus, the electronic control unit 54 judges whether or not the transmission is automatic or manual based on the levels of the neutral signal $N_T$ and starter signal $S_T$ at the start of the engine. Namely, if the neutral signal $N_T$ is at the ground level when the starter signal $S_T$ rises to the high level, the electronic control unit 54 judges that the transmission is manual (FIG. 3). Otherwise (i.e., if the neutral signal $N_T$ is at the high level when the starter signal $S_T$ rises to the high level), the electronic control unit 54 judges that the transmission is automatic (FIG. 2).

The neutral signal $N_T$ is pulled up by a voltage source (not shown) through a pull-up resistor within the electronic control unit 54. Thus, when the electronic control unit 54 is used with an automatic transmission (FIG. 2), the state of the neutral switch 53 can be detected if the starter switch 51 is turned off. Namely, when both the starter switch 51 and the magnet coil 52 are open (turned off), the neutral signal $N_T$ is pulled up to the high level of the voltage source. On the other hand, when the starter switch 51 is open and the neutral switch 53 is closed, the neutral signal $N_T$ falls substantially to the ground level. Thus, when the starter switch 51 is open, the position of the transmission (i.e., whether the transmission is at the neutral or the driving position) can be determined on the basis of the level of the neutral signal $N_T$.

It is noted that the circuit structure of FIG. 2 used with the automatic transmission allows the current supply to the starter motor and thereby enables the engine to start only when the neutral switch 53 is closed and the transmission is in the neutral or parking range and outside of the driving range. Furthermore, it is noted that the power supply circuit is first wired by an operator as shown in FIG. 2 if the vehicle is provided with an automatic transmission, and as shown in FIG. 3 if the vehicle is provided with a manual transmission.

Figure 4:
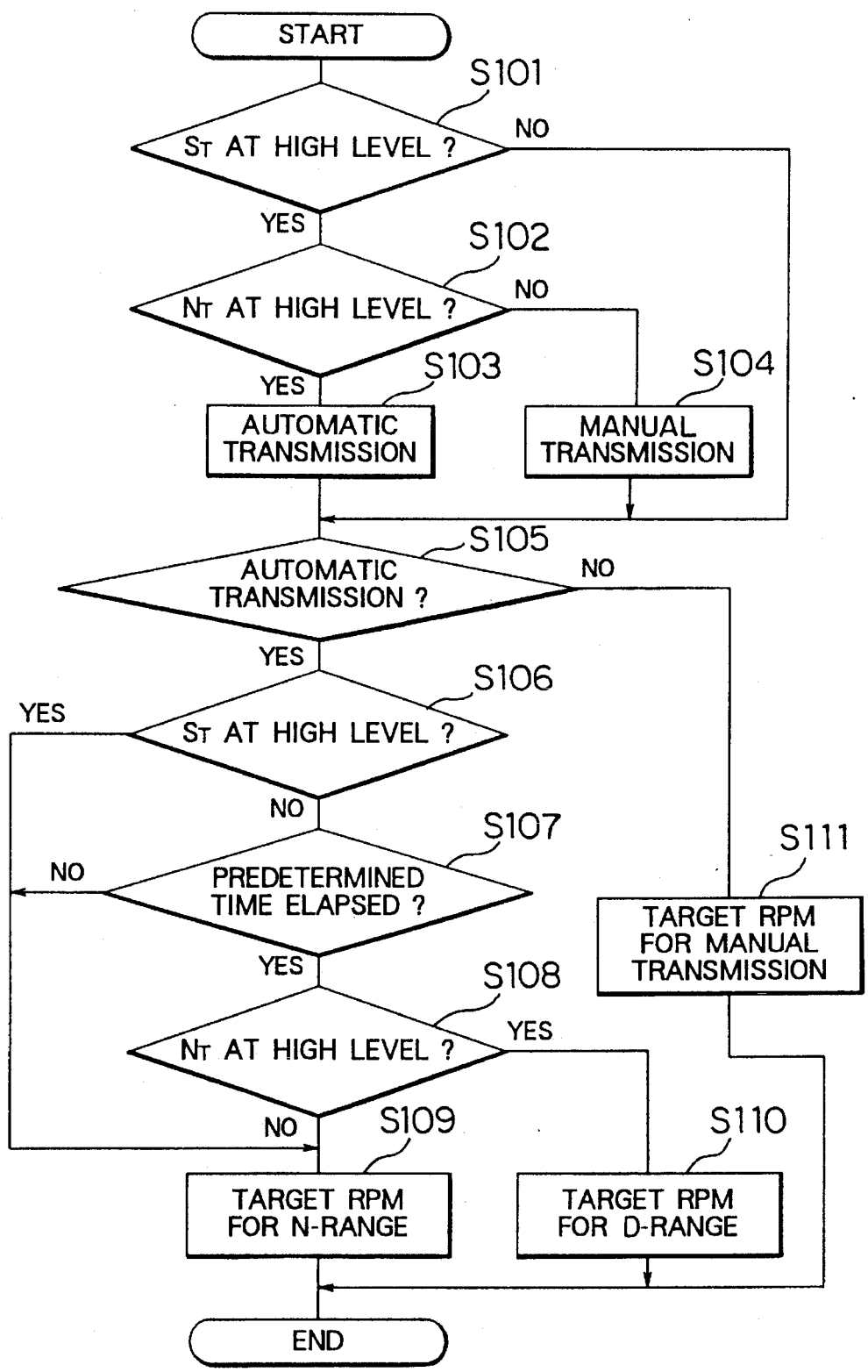
FIG. 4 is a flowchart showing the procedure for identifying the kind of transmission, wherein the target idling RPM is selected in accordance with the result of the identification of the kind of the transmission.

FIG. 4 is a flowchart showing the procedure for identifying the kind of transmission, wherein the target idling RPM is selected in accordance with the result of the identification of the kind of the transmission. The procedure of FIG. 4 is performed by an microcomputer within the electronic control unit 54. The type or kind of transmission (automatic or manual) is determined at steps S101 through S104. These steps determine the type of transmission upon activation of the starter motor. At steps S105 through S111, on the other hand, the target idling speed is determined in accordance with the kind of the transmission and, if the transmission proves automatic, the idling speed is determined further in accordance with the position of the transmission. Next, the procedure of FIG. 4 is described in detail.

At step S101, it is judged whether or not the starter signal $S_T$ is at the high level (i.e., at the level of the output voltage of the battery 50). If the judgement is affirmative at step S101 (i.e., if the starter signal $S_T$ is at the high level), the execution proceeds to step S102, where it is judged whether or not the neutral signal $N_T$ is at the high level. If the judgement is affirmative at step S102, the execution proceeds to step S103, where it is determined that the transmission is automatic and the result is registered in the memory of the microcomputer (i.e., the flag for the automatic transmission is set). As noted above, the affirmative judgments at steps S101 and S102 imply that both the starter switch 51 and the neutral switch 53 are turned on and hence the transmission is automatic.

On the other hand, if the judgement is negative at step S102 (i.e., if the neutral signal $N_T$ is at the ground level), the execution proceeds to step S104, where it is determined that the transmission is manual and the result is registered in the memory of the microcomputer (i.e., the flag for the automatic transmission is reset). A negative judgment at step S102 after an affirmative judgment at step S101 implies that the circuit is wired as shown in FIG. 3 and hence the transmission is manual.

After step S103 or step S104, the execution proceeds to step S105.

If the judgement is negative at step S101 (i.e., if the starter signal $S_T$ is at the low level), the execution proceeds to step S105. The negative judgment at step S101 implies that the starter switch 51 is turned off and hence the determination of the kind of the transmission at steps S102 through S104 is unnecessary. In the case of the automatic transmission (FIG. 2), the starter signal $S_T$ is at the low level and hence the judgment is negative at step S101 if the neutral switch 53 is turned off, even when the starter switch 51 is turned on. Under such circumstances, however, the power is not supplied to the starter motor from the battery 50 and hence the engine cannot be started. It is noted that when the engine with an automatic transmission is to be started, the transmission must be at the neutral or the parking range. Thus, provided that the neutral switch 53 is open, turning on the starter switch 51 has no actual effect and no harm can result therefrom.

At step S105, it is judged whether or not the transmission is automatic. The judgment is made by referencing the flag for the automatic transmission. If the judgement is affirmative at step S105, the execution proceeds to steps S106 through S110 where the position of the transmission is determined and the target idling speed is set accordingly.

Namely, at step S106, it is judged whether or not the starter signal $S_T$ is at the high level. If the judgement is negative at step S106 (i.e., the starter signal $S_T$ is at the low level), the execution proceeds to step S107, where it is judged whether or not a predetermined time has elapsed after the starter switch 51 is turned off (i.e., after the starter signal $S_T$ falls to the low level). It is assumed that at least a short interval of time elapses between the time point at which the engine is started and the time point at which the driver of the vehicle shifts the transmission to the driving range. Thus, if the judgement is negative at step S107, the execution proceeds to step S109 where the target idling speed for the neutral range of the automatic transmission is selected, and the idling speed control (ISC) valve 26 is controlled accordingly. The target idling speed for the neutral range of the automatic transmission may be 700 RPM.

On the other hand, if the judgement is affirmative at step S107, the execution proceeds to step S108, where it is judged whether or not the neutral signal $N_T$ is at the high level. As noted above, in the case of the automatic transmission (FIG. 2), when the starter switch 51 is open, the level of the neutral signal $N_T$ reflects the state of the transmission. Thus, if the judgement is affirmative at step S108 (i.e., if the neutral signal $N_T$ is at the high level and hence the neutral switch 53 is open), the execution proceeds to step S110, where the target idling RPM for the driving range of the automatic transmission is selected and the idling speed control (ISC) valve 26 is controlled accordingly. The target idling speed for the neutral range may be 650 RPM. On the other hand, if the judgement is negative at step S108, (i.e., if the neutral signal $N_T$ is at the low level and hence the neutral switch 53 is closed), the execution proceeds to step S109, where the target idling speed (e.g., 700 RPM) for the neutral range of the automatic transmission is selected, and the idling speed control (ISC) valve 26 is controlled accordingly.

If the judgement is negative at step S105 (i.e., if the flag for the automatic transmission is reset), the execution proceeds to step S111, where the target idling speed for the manual transmission is selected, and the idling speed control (ISC) valve 26 is controlled accordingly. The target idling speed for the manual transmission is set at a level sufficiently low (e.g., 600 RPM) to improve the fuel economy.

As described above, the electronic control unit 54 determines the kind of the transmission upon start of the engine, and immediately optimizes the control parameters of the engine including the target idling speed in accordance with the detected kind of the transmission. In the case of the above embodiment, the idling speed is controlled in accordance with the kind of the transmission. Other control parameters of the engine may also be controlled in accordance with the kind of the transmission. For example, in controlling the fuel injection, the reference RPM for performing the fuel cuts during deceleration may be selected in accordance with the kind of the transmission. Further, in controlling the ignition timings, the fundamental ignition timing may be determined in accordance with the kind of the transmission.

What is claimed is:

1. A common type engine controller for controlling an engine of an automotive vehicle in accordance with a kind, automatic or manual, of a transmission associated with said engine, said engine controller comprising:

first signal generator means for generating a first signal which is at a first level when said engine is started, and is at a second level otherwise;

second signal generator means for generating a second signal which, in the case where said transmission associated with said engine is automatic, is at a first level when said engine is started, and which is continually at a second level in the case where said transmission associated with said engine is manual; and first judgment means, coupled to said first and second signal generator means, for determining said kind of said transmission in response to said first and second signal, wherein, upon receiving said first level of said first signal, said first judgment means determines that the transmission is automatic if said second signal is at said first level; and that the transmission is manual if said second signal is at said second level.

2. An engine controller as claimed in claim 1, wherein:

said engine controller comprises, in the case where said transmission is automatic, a starter switch, a neutral switch and a magnet coil coupled serially across a battery supplying a power to a starter motor for said engine, wherein said starter switch is closed by a driver of said vehicle when said engine is started and said neutral switch is closed when said transmission is at a neutral or parking position, said magnet coil controlling a current supply from said battery to a starter motor of said engine upon start of said engine; and said engine controller comprises, in the case where said transmission is manual, said starter switch and said magnet coil coupled serially across said battery;

wherein said first signal generated by said first signal generator means is supplied by a voltage at a terminal of said magnet coil at a side coupled to said battery; and said second signal generated by said second signal generator means is supplied by a voltage at a junction point between said starter switch and said neutral switch in the case where said transmission is automatic, and a ground voltage in the case where said transmission is manual.

3. An engine controller as claimed in claim 2, wherein:

said second signal generator means further comprises: circuit means for retaining said second signal at said first level when, in the case where said transmission is automatic, said neutral switch is open and said junction point between said starter switch and said neutral switch is not grounded through said magnet coil;

said engine controller further comprising second judgment means for determining, in the case where said transmission is automatic, a position of said transmission, wherein said second judgment means determines that said transmission is at a neutral position when (1) said first judgment means determines that said transmission is automatic, (2) said first signal is at said second level, and (3) said second signal is at said second level.

4. An engine controller as claimed in claim 3, wherein said second judgment means determines that said transmission is at a neutral position when (1) said first judgment means determines that said transmission is automatic, (2) said first signal is at said second level, (3) a predetermined length of time has elapsed after said first signal goes to said second level, (4) and said second signal is at said second level.

5. An engine controller as claimed in claim 3, wherein said engine controller comprises an electronic control unit consisting of a microcomputer and said said first and said second judgment means comprise a program executed by said microcomputer.

6. An engine controller as claimed in claim 3, wherein said engine controller comprises idling speed control means for controlling an idling RPM of said engine in accordance with a detected kind of said transmission, and when said detected kind of said transmission is automatic, said idling speed control means controls said idling RPM further in accordance with a position of said transmission detected by said second judgment means.

7. An engine controller as claimed in claim 1, wherein said engine controller comprises idling speed control means for controlling an idling RPM of said engine in accordance with a detected kind of said transmission.

8. An engine controller as claimed in claim 7, wherein said idling speed control means controls said idling RPM of said engine by means of a feedback control method.

9. An engine controller as claimed in claim 1, wherein said engine controller comprises an electronic control unit consisting of a microcomputer and said first judgment means comprises a program executed by said microcomputer.

* * * * *